(12) United States Patent
Bishop et al.

(10) Patent No.: US 11,817,702 B2
(45) Date of Patent: Nov. 14, 2023

(54) SECTIONALIZING USING CODED PULSES AND PULSE TESTING

(71) Applicant: S&C Electric Company, Chicago, IL (US)

(72) Inventors: Martin T Bishop, Oak Creek, WI (US); Stephen E Williams, Caledonia, WI (US); Michael John Meisinger, Sr., Chicago, IL (US)

(73) Assignee: S&C Electric Company, Chicago, IL (US)

( * ) Notice: Subject to any disclaimer, the term of this patent is extended or adjusted under 35 U.S.C. 154(b) by 525 days.

(21) Appl. No.: 17/185,378

(22) Filed: Feb. 25, 2021

(65) Prior Publication Data

US 2021/0273451 A1 Sep. 2, 2021

Related U.S. Application Data

(60) Provisional application No. 62/983,799, filed on Mar. 2, 2020.

(51) Int. Cl.
*H02J 3/00* (2006.01)
*H02H 7/26* (2006.01)
*H02J 3/14* (2006.01)

(52) U.S. Cl.
CPC ........... *H02J 3/0012* (2020.01); *H02H 7/262* (2013.01); *H02H 7/263* (2013.01); *H02J 3/14* (2013.01)

(58) Field of Classification Search
CPC ........ H02J 13/0004; H02J 3/0012; H02J 3/14; H02H 3/066; H02H 3/063; H02H 7/263; H02H 7/262; Y02B 70/3225; Y04S 20/222

USPC .......................................................... 361/63
See application file for complete search history.

(56) References Cited

U.S. PATENT DOCUMENTS 7,626,397 B2 * 12/2009 Opfer ................... H02H 11/005
324/555
2010/0296215 A1 * 11/2010 Montenegro .......... H01H 75/04
361/59

FOREIGN PATENT DOCUMENTS

CN     102084568 A  *  6/2011   ............. H01H 75/04
CN     102812663 A  *  12/2012  ............. H02J 3/006

OTHER PUBLICATIONS

Machine translation of Biallas et al. Chinese Patent Document CN 102812663 A Dec. 2012 (Year: 2012).*

(Continued)

*Primary Examiner* — Kevin J Comber

(57) ABSTRACT

A power restoration system for restoring power to feeder segments in response to a fault. The system includes a reclosing device having a switch and one or more sensors for measuring current and/or voltage on the feeder, where the reclosing device performs a pulse testing process to determine circuit fault conditions. The system also includes a plurality of switching devices electrically coupled along the feeder, where each switching device includes a section switch and one or more sensors for measuring current and/or voltage on the at least one feeder. In one embodiment, each switching device recognizes predetermined pulse codes having a sequence of pulses, where the reclosing device uses the pulse testing process to generate and selectively transmit defined pulse codes on the feeder that selectively cause the section switches to change states between an open state and a closed state depending on the code.

18 Claims, 2 Drawing Sheets

(56) References Cited

OTHER PUBLICATIONS

Machine translation of Montenegro et al. Chinese Patent Document CN 102084568 A Jun. 2011 (Year: 2011).*

* cited by examiner

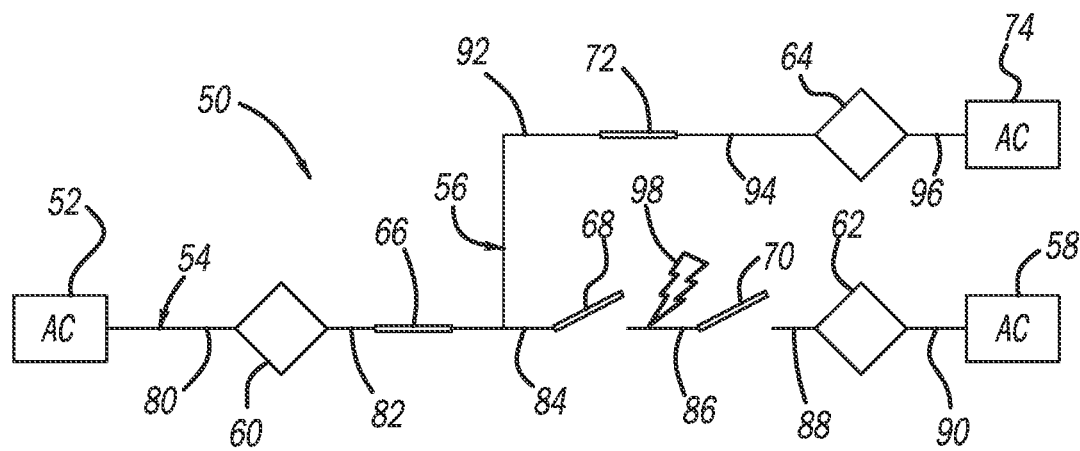
FIG-2
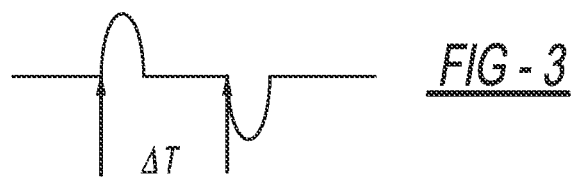
FIG-3
FIG-4
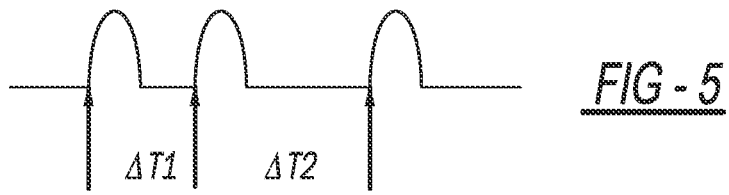
FIG-5
FIG-6

SECTIONALIZING USING CODED PULSES AND PULSE TESTING

CROSS-REFERENCE TO RELATED APPLICATION

This application claims the benefit of priority from the U.S. Provisional Application No. 62/983,799, filed on Mar. 2, 2020, the disclosure of which is hereby expressly incorporated herein by reference for all purposes.

BACKGROUND

Field

This disclosure relates generally to a power restoration system for restoring power to as many network segments as possible in an electrical power distribution network in response to detecting a fault.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down by transformers to a medium voltage for distribution. The substations provide the medium voltage power to a number of three-phase feeders including three single-phase feeder lines that provide medium voltage to various distribution transformers and lateral line connections. A number of three-phase and single-phase lateral lines are tapped off of the feeder that provide the medium voltage to various distribution transformers, where the voltage is stepped down to a low voltage and is provided to a number of loads, such as homes, businesses, etc.

Power distribution networks of the type referred to above typically include a number of switching devices, breakers, reclosers, interrupters, etc. that control the flow of power throughout the network. A vacuum interrupter is a switch that has particular application for these types of devices. A vacuum interrupter employs opposing contacts, one fixed and one movable, positioned within a vacuum enclosure. When the interrupter is opened by moving the movable contact away from the fixed contact the arc that is created between the contacts is quickly extinguished as the AC current goes through zero in the vacuum. A vapor shield is provided around the contacts to contain the by-products of the arcing. For certain applications, the vacuum interrupter is encapsulated in a solid insulation housing that may have a grounded external surface.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Many times the fault will be a transient or intermittent fault as opposed to a persistent or bolted fault, where the thing that caused the fault is removed a short time after the fault occurs, for example, a lightning strike, where the distribution network will almost immediately begin operating normally after a brief disconnection from the source of power.

Fault interrupters, such as reclosers that employ vacuum interrupters, are provided on utility poles and in underground circuits along a power line and have a switch to allow or prevent power flow downstream of the recloser. These reclosers detect the current and voltage on the feeder to monitor current flow and have controls that indicate problems with the network circuit, such as detecting a high current during a fault event. If such a high fault current is detected the recloser is opened in response thereto, and then after a short delay is closed in a process for determining whether the fault is still present. If a high fault current flows when the recloser is closed, it is immediately re-opened. If the fault current is detected again or two more times during subsequent opening and closing operations, then the recloser remains open, where the time between tests may increase after each test. Reclosers are known that use pulse testing technologies where the closing and then opening of vacuum interrupter contacts is performed in a pulsed manner, where the pulses are typically less than one-half of a fundamental frequency current cycle, so that the full fault current is not applied to the network while the recloser is testing to determine if the fault is still present.

When a fault is detected, it is desirable that the first fault interrupter upstream from the fault be opened as soon as possible so that the fault is quickly removed from the network to prevent adverse affects on the network, such as damage to equipment, and so that the loads upstream of that fault interrupter are not disconnected from the power source and service is not interrupted to them. It is further desirable that if the first fault interrupter upstream from the fault does not open for whatever reason, then a next fault interrupter upstream from the fault is opened, and so on. In order to accomplish this, it is necessary that some type of communications or coordination protection scheme be employed in the network so that the desired fault interrupter is opened in response to the fault.

Sections of the feeder that lose power that are downstream of a faulted feeder section, i.e., sections of the feeder between reclosers, and have no fault can have power service restored using a second source, where a normally open recloser would prevent the second source from providing power to the feeder during normal operation. If this network configuration only includes one feeder having sources at both ends, where one of the sources is isolated with a normally open switch, then it is relatively straightforward to isolate the feeder section having the fault and provide power from both sources at opposite ends of the feeder. However, if there are multiple sources and multiple interconnected feeders, switch coordination is much more complex to isolate the fault to only the feeder section that is faulted. Thus, in these network configurations some type of communications systems is generally required to pass information between devices to identify the fault location and then restore unfaulted sections. However, these types of communications systems that may employ wireless communications schemes are only as reliable as the communications scheme itself.

A sectionalizer is a self-contained, circuit-opening device typically used in combination with source-side protective devices, such as reclosers or circuit breakers, to automatically isolate faulted sections of an electrical distribution network. A faulted circuit indicator is a device that automatically detects and identifies faults in an electrical distribution network, but does not have switching capabilities to open a power line. The devices are typically distributed between and among the reclosers to provide a system for isolating smaller sections of the network in response to a fault. Faulted circuit indicators and sectionalizers rely on observing a sequence of fault currents and the presence and absence of voltage either to indicate the presence of a fault or count the number of reclosing attempts, and then perform circuit isolation by opening the sectionalizer when the maximum number of reclosing attempts has been reached. Existing power distribution circuit sectionalizers detect the passage of fault currents, including both the initial fault event and subsequent recloser-initiated events, as part of more elaborate fault isolation and restoration processes. These processes may include counting discrete intervals of fault current passage, or counting discrete intervals of voltage presence and absence.

Distribution feeder fault sectionalizing is typically performed using these types of devices that have current and/or voltage sensing and measurement capability. These devices either have current and/or voltage protection elements and fault interrupting capability or are switching devices that cannot interrupt faults, but count fault events and open after another device repeatedly tests for fault presence by reclosing. Equipment and devices that recognize pulse testing operations measure current and/or voltage and require sensors and controls that can implement pulse recognition algorithms.

SUMMARY

The following discussion discloses and describes a system for restoring power in an electrical power distribution network to as many feeder segments as possible in response to a fault in one of the segments. The system includes at least one feeder and at least one power source providing power to the at least one feeder. The system further includes at least one normally closed reclosing device electrically coupled to the at least one feeder and having an interrupter switch and one or more sensors for measuring current and/or voltage on the at least one feeder, where the at least one normally closed reclosing device detects fault current and is operable to perform a pulse testing process to clear the fault. The system also includes a plurality of switching devices electrically coupled along the at least one feeder, where each switching device includes a section switch and one or more sensors for measuring current and/or voltage on the at least one feeder. In one embodiment, each switching device is operable to recognize predetermined pulse codes having a sequence of pulses, where the at least one normally closed reclosing device uses the pulse testing process to generate and selectively transmit defined pulse codes on the at least one feeder that selectively cause the section switches to change states between an open state and a closed state depending on the code.

Additional features of the disclosure will become apparent from the following description and appended claims, taken in conjunction with the accompanying drawings.

BRIEF DESCRIPTION OF THE DRAWINGS

FIG. 2 is a simplified schematic illustration of an electrical power distribution network showing a power restoration system including reclosers and switches;

FIG. 3 is an illustration of a typical pulse sequence of a test for identifying a fault;

FIG. 4 is an illustration of a three positive pulse sequence switch command with one defined time interval;

FIG. 5 is an illustration of a three positive pulse sequence switch command with two defined time intervals; and FIG. 6 is an illustration of alternating pairs of pulses having one time interval between pulses in the pairs and another time interval between other pairs of pulses in the sequence.

DETAILED DESCRIPTION OF THE EMBODIMENTS

Figure 1:
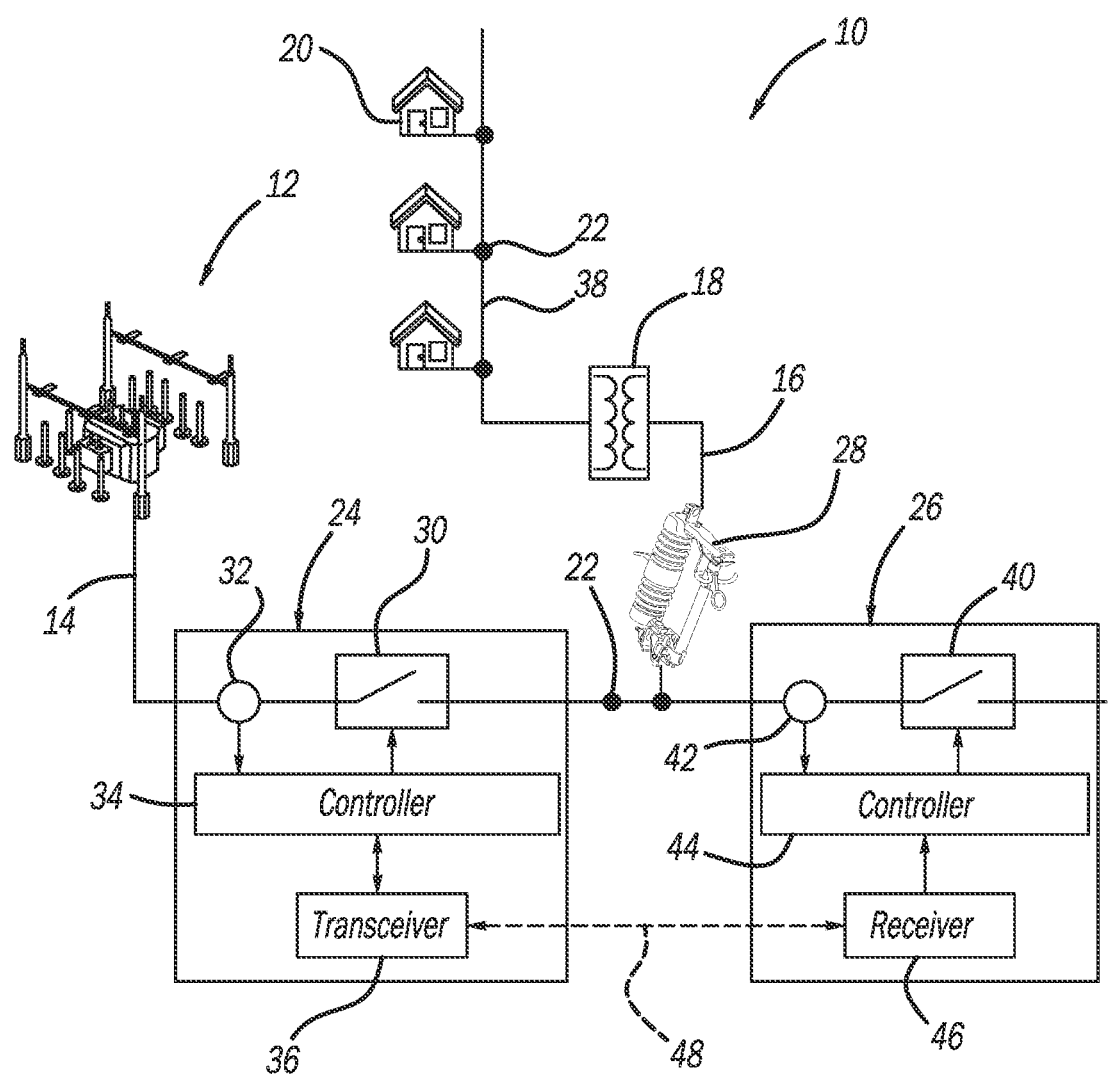
FIG. 1 is a simplified schematic illustration of an electrical power distribution network.

The following discussion of the embodiments of the disclosure directed to a power restoration system for restoring power to as many feeder sections as possible in an electrical power distribution network in response to a fault, where in one embodiment the system employs pulse sequence codes sent from reclosers to switching devices, is merely exemplary in nature, and is in no way intended to limit the disclosure or its applications or uses.

The present disclosure proposes a power restoration system that limits the customers that are out of service for an extended time to only those in the faulted section of a distribution feeder. The distribution feeder is divided into sections using switching devices, and if a fault occurs in one of the sections, the switching devices can isolate the fault through, for example, coded pulse messaging from a recloser. After sensing and clearing the fault, the recloser pulse tests the circuit to determine if the fault is still present. If the fault is detected, in one implementation, the recloser sends a coded pulse command to open all of the switching devices. The recloser then pulse tests the feeder again and closes the switching devices in succession using other coded pulse commands, proceeding with the switching device closest to the recloser, with a pulse test following each close command. If a fault is found using a pulse test following a switch close command, that same switching device is then opened, and testing continues along a second or third branch of the feeder, as determined by circuit topology pre-configured in the recloser. Pulse testing from normally open reclosers can also be initiated following a time delay triggered by the loss of voltage at those reclosers. The switching devices are programmed to recognize the coded pulse sequences and open prior to the restoration steps. This is one concept that can use the pulse generation capability of the recloser and the pulse recognition capability of the switch controls to implement a communications link between the recloser and the switching devices using the power line as the communications channel.

Coded pulse recognition within the switching devices requires sensors and controls that monitor local voltages and currents, resulting in a reliable power distribution system independent of a separate communications system. In situations where faults require full line voltage for one or more seconds to reestablish after power interruption, the described method can incorporate a recloser close with a fast definite time overcurrent protection element. The switching devices are closed in succession using coded pulse commands until the fault is re-established. Once the fault recurs, the last switching device to close is opened. The time delay between switch closing is user configurable and the recloser may be configured to automatically increase the time delay for repetitive fault conditions.

FIG. 1 is a schematic type diagram of an electrical power distribution network 10 including an electrical substation 12 that steps down high voltage power from a high voltage power line (not shown) to medium voltage power, a three-phase feeder 14 that receives a medium voltage power signal from the substation 12, and a lateral line 16 that receives the medium voltage power signal from the feeder 14. The medium voltage power signal is stepped down to a low voltage signal by a number of distribution transformers 18 strategically positioned along the lateral line 16, and the low voltage signal is then provided to a number of loads 20 represented here as homes through a secondary service line 38. The lateral line 16 includes a fuse 28 positioned between the feeder 14 and the first load 20 on the lateral line 16 proximate to a tap location where the lateral line 16 is connected to the feeder 14. The fuse 28 is an independent electrical device that is not in communication with other components or devices in the network 10, where the fuse 28 creates an open circuit if an element within the fuse 28 heats up above a predetermined temperature as a result of high fault current so as to prevent short-circuit faults on the lateral line 16 from affecting other parts of the network 10.

The network 10 includes a number of reclosers of the type referred to above provided at certain intervals along the feeder 14 represented by a recloser 24 that receives the medium voltage signal from the substation 12 on the feeder 14. Although only shown as a single line in the network 10, the feeder 14 would include three conductors, one for each phase, where a separate recloser would be provided in each conductor in some applications, or a three-phase recloser may also be employed. A number of utility poles 22 are provided along the feeder 14, the lateral line 16 and the secondary service line 38, where the recloser 24 would be mounted on a certain one of the poles 22. The recloser 24 includes a vacuum interrupter switch or other switching device 30 for opening and closing the recloser 24 to allow or prevent current flow therethrough on the feeder 14, where the switch 30 is capable of providing pulses for pulse testing. The recloser 24 also includes sensors 32 for measuring the current and voltage of the power signal propagating on the feeder 14, a controller 34 for processing the measurement signals and controlling the position of the switch 30, and a transceiver 36 for transmitting data and messages to a control facility and/or to other reclosers and components in the system 10. The network 10 also includes a number of switching devices provided at certain intervals along the feeder 14 represented by a switching device 26, also provided on one of the poles 22, where the switching device 26 includes a switch 40, a voltage/current sensor 42, a controller 44 that may provide pulse code recognition consistent with the discussion herein, and possibly a receiver 46, such as a radio, for some embodiments. In those non-pulse code recognition embodiments, the receiver 46 will receive commands from the recloser 24 to open or close the switch 40 by a suitable communications connection represented by line 48, such as wireless, cellular, fiber optic, hard-wired, etc., where the sensor 42 would not be needed in those embodiments. The configuration and operation of reclosers and switching devices of this type are well understood by those skilled in the art.

FIG. 2 is a simplified single line type diagram of an electrical power distribution network 50 that illustrates a power restoration system and method as described herein. The network 50 includes an AC power source 52, such as electrical substations that includes power transformers that step down high voltage power from a high voltage power line (not shown) to a medium voltage power line, at one end of a three-phase feeder 54 and an AC power source 58 at an opposite end of the feeder 54, where a three-phase feeder 56 is tapped off of the feeder 54. The network 50 also includes a normally closed recloser 60 adjacent to the source 52 at one end of the feeder 54, a normally open recloser 62 adjacent to the source 58 at an opposite end of the feeder 54 from the recloser 60, and a normally open recloser 64 adjacent to an AC power source 74 at an end of the feeder 56 opposite from the feeder 54. Because the recloser 60 is normally closed and the reclosers 62 and 64 are normally open, all of the loads (not shown) along the feeders 54 and 56 are serviced by the source 52 during normal operation.

Three-phase switching devices 66, 68 and 70 are provided along the feeder 54 between the reclosers 60 and 62, and a switching device 72 is provided on the feeder 56 between the recloser 64 and the location where the feeder 56 is tapped off of the feeder 54 between the switching devices 66 and 68. The reclosers 60, 62 and 64 and the switching devices 66-72 would all likely be mounted on utility poles, where the span length between adjacent reclosers is typically miles. The feeders 54 and 56 have a number of feeder segments between adjacent devices in the network 10. In this example, a feeder segment 80 is provided and defined between the source 52 and the recloser 60, a feeder segment 82 is provided and defined between the recloser 60 and the switching device 66, a feeder segment 84 is provided and defined between the switching devices 66 and 68, a feeder segment 86 is provided and defined between the switching devices 68 and 70, a feeder segment 88 is provided and defined between the switching device 70 and the recloser 62, a feeder segment 90 is provided and defined between the recloser 62 and the source 58, a feeder segment 92 is provided and defined between the tap location of the feeder 56 and the switching device 72, a feeder segment 94 is provided and defined between the switching device 72 and the recloser 64 and a feeder segment 96 is provided and defined between the recloser 64 and the source 74.

The reclosers 60, 62 and 64 and the switching device 66-72 are all able to measure voltage and current on the feeder 54 or 56, and the reclosers 60, 62 and 64 have the necessary switch types, sensors and controls to be able to provide fault detection and clearing using known pulse testing techniques, but the switching devices 66-72 are not able to provide fault clearing or pulse testing. In the pulse code recognition embodiment referred to above, the switching devices 66-72 have the capability to sense the pulse magnitude, duration and intervals of pulses sent by the reclosers 60, 62 and 64 to recognize embedded codes on the power line and act on the received codes to open or close the switch 40 consistent with the discussion herein. In the non-pulse code recognition embodiments, the switching devices 66-72 would not need to have this capability, where the command to open or close the switch 40 is provided on the line 48. The switching devices 66-72 may also require local power to perform these functions when power is not on the feeders 54 and 56, which can be provided by current transformers or other energy harvesting devices with a local energy source, such as a battery (not shown). The switching devices 66-72 are opened when the circuit is de-energized so that fault interruption capability is not required in the switching devices 66-72.

A fault 98 is shown in the feeder segment 86, where it is desirable to open the switching devices 68 and 70 to limit the number of customers that are affected by the fault 98, where the recloser 62 would be closed so that loads in the segments 88 and 90 would be served by the source 58. This configuration of the network 50 is shown in FIG. 2. When the fault 98 is detected, the recloser 60 opens and then immediately performs pulse testing to determine if the fault 98 is still present and is a permanent fault, and if so, the recloser logic initiates a scheme or operation to isolate the fault 98 in the segment 86 that will ultimately open the switching devices 68 and 70 and close the switching devices 66 and 72.

The recloser 60 uses low energy pulse testing on the network 50 to determine if the fault 98 is still present on the network 50 prior to closing the recloser 60. The pulse testing is performed using logic built into the recloser controls to adequately test for faults while avoiding the repetitive high current stress of conventional reclosing when a fault is present on the circuit. The recloser 60 generates a pulse, for example by switch contact closing for a very brief time, by solid state circuitry or by other devices, so that the current pulse is typically less than a half-cycle of the fundamental frequency for a load connected to the network 50. The pulse generating structure may be the switch itself, or the pulse generating circuitry may be a circuit disposed in parallel with the switch, or in other suitable configurations. A pulse that results when the fault 98 is present is generally longer in duration than a load pulse. In one embodiment, the recloser 60 may generate additional pulses of either polarity to confirm the presence of the fault 98, for example, the pulse sequence shown in FIG. 3, where the time difference between the pulses is approximately 4-5 fundamental frequency cycles. The switching devices 66-72 do not react to the pulse testing pulses because they are not programmed to react to pulses having this timing between the pulses.

In the pulse code recognition embodiment, once the fault pulse testing is complete and the fault 98 is identified, the recloser 60 sends a coded pulse command to all of the switching devices 66-72 that causes them to open. The command is a series of pulses, such as, for example, three positive pulses, such as shown in FIG. 4, generated by the pulse closing operation of the switch 30 and having a certain delay ΔT between the pulses that the switching devices 66-72 recognize as a universal open command. The switching devices 66-72 are equipped to recognize either a voltage pulse or a current pulse and measure the time between the two pulses that are observed. In one implementation, the timing between the start of each pulse is the coded message. The three-pulse sequence recognized by all of the switching devices 66-72 as a command to open with no specific encoded time for any individual switching device 66-72 can be sent by any of the reclosers 60, 62 and 64 to broadcast an open command to open all of the switching devices 66-72. Because the switching device 70 is on the other side of the fault 98 from the recloser 60, it may not receive the open pulse command from the recloser 60, and will remain closed. However, after a pre-programmed time delay, the reclosers 62 and 64 can also send the same open pulse command so that the switching device 70 is opened. For example, in the event of a bolted three-phase fault on the feeder 54, it is anticipated that a pulse sequence would not be transmitted from the recloser 60 through the fault 98 to the switching device 70 on the opposite side of the fault 98. Thus, to open all the switching devices 66-72 on the feeders 54 and 56 bounded by the reclosers 60, 62 and 64 (under the assumption of a bolted three phase fault), each recloser 60, 62 and 64 could broadcast the open pulse sequence command to open all of the switching devices 66-72, following some predetermined time delay related to sensing loss of voltage.

Once all of the switching devices 66-72 are open, then the recloser 60 performs a pulse test to determine if the fault 98 is between the recloser 60 and the closest switching device 66, and if not, performs a predetermined pulse sequence that commands the switching device 66 to close. The recloser 60 is programmed to perform pulse and inverse pulse tests, such as shown in FIG. 3, with a variable amount of time ΔT between the start of the pulse and the inverse pulse that is independently recognized by each of the switching devices 66-72, where the time ΔT is different than time between pulses used during the pulse testing. Thus, a distinct time is defined for each of the switching devices 66-72 on the feeders 54 and 56. For example, the switching device 66 may be the only switching device programmed to change its open/close state if it receives a pulse and inverse pulse having a ΔT of 150 ms, the switching device 68 may be the only switching device programmed to change its open/close state if it receives a pulse and inverse pulse having a ΔT of 225 ms, the switching device 70 may be the only switching device programmed to change its open/close state if it receives a pulse and inverse pulse having a ΔT of 300 ms, and the switching device 72 may be the only switching device programmed to change its open/close state if it receives a pulse and inverse pulse having a ΔT of 375 ms. In other embodiments, multiple pulses of the same or alternating polarity could also be considered to send a coded message.

When the switching device 66 is closed, the recloser 60 will then perform the pulse testing, and since the switching device 68 is open, the test will show no fault. The recloser 60 then sends the pulse sequence command unique to the switching device 68 to close the switching device 68, and then will perform the pulse testing again. Since the recloser 60 is now re-connected to the faulted feeder section with the fault 98, the recloser 60 will detect the fault 98, and will perform the proper pulse sequence to re-open the switching device 68. The recloser 60 will also now know that the fault 98 is on the feeder 54. The recloser 60 will then send a communications message to the recloser 62 to perform pulse testing from its end. The switching device 70 may be closed because it did not receive the open pulse sequence command from the recloser 60 being on the other side of the fault 98, and the recloser 62 will detect the fault 98. The recloser 62 will then perform the proper pulse sequence to open the switching device 70, where the fault 98 is now isolated in the section 88. The recloser 62 will also close so that power is restored to the loads downstream of the switching device 70 relative to the recloser 60 from the source 58. If the recloser 62 had opened the switching device 70 when the other switching devices 66, 68 and 72 were opened, then the recloser does not detect the fault current. Also, since the recloser 60 knows the fault 98 is on the feeder 54, it will send a pulse sequence command to close the switching device 72. If there is a possibility that multiple faults could be present, then the recloser 60 could perform pulse testing on the feeder 56.

As mentioned above, instead of providing the commands from the reclosers 60, 62 and 64 to open and close the switching devices 66-72 using codes pulses on the power line, those commands can be provided to the switching devices 66-72 on the line 48 as direct commands without the need for the switching devices 66-72 to decipher pulse codes. Therefore, less sophisticated control algorithms would be required in the switching devices 66-72 and voltage and current sensors would not be needed in the switching devices 66-72.

There are other concepts that can be applied using this coded pulse technique that may allow faster restoration with fewer pulses from the reclosers 60, 62 and 64. For example, for a pulse signal that uses three pulses as shown in FIG. 5, the time delays between the pulses can be used to carry specific messaging. The timing codes can be mapped to specific switching devices if they are applied as ΔT1 times. If the ΔT2 time has two defined times assigned (open and close) then the message can be used by the recloser 60, 62 or 64 to open and close a specific switching device. A definite open or close command is preferred over a 'toggle switch state' command due to the inherent difficulty in ascertaining switch position prior to issuance of the toggle command. Example time values ΔT1 and ΔT2 are shown in Table I below for the switches 66-72.

TABLE I

| Pulse Sequence No. | ΔT1 (ms) | ΔT2 (ms) | Definition of pulse |
| --- | --- | --- | --- |
| 1 | 150 | 75 | SW-66 open |
| 2 | 225 | 75 | SW-68 open |
| 3 | 300 | 75 | SW-70 open |
| 4 | 375 | 75 | SW-72 open |
| 5 | 150 | 150 | SW-66 close |
| 6 | 225 | 150 | SW-68 close |
| 7 | 300 | 150 | SW-70 close |
| 8 | 375 | 150 | SW-72 Close |
| 9 | 75 | 75 | general open |
| 10 | 75 | 150 | general close |

Another coding method includes varying the interval between individual pulses. In the pulse sequence example shown in FIG. 6 there are two distinct time intervals applied, namely, ΔT1 and ΔT2. The shorter time interval ΔT1 might be used to represent a digital 0 and the longer time interval ΔT2 might be used to represent a digital 1. Using this technique the pulse sequence in FIG. 6 would represent a binary 0101 message. This technique can be used to assign sixteen different messages that can be assigned to switching devices for opening and closing commands. Longer messages could also be created with an additional pulse.

The ability to send a specific open or close command to a specific switching device opens opportunities for other techniques to be used to quickly isolate a faulted section and minimize the number of pulse events required. As one example, if the general topology of the feeder segment is known during the configuration process, fault current levels at different locations along the feeder can be calculated and preloaded into the restoration logic. Since the recloser observes the fault current, an estimate of the location and therefore the switching devices that are likely closest to the fault 98 can be opened first prior to entering into the restoration pulse testing logic.

Other techniques for sending messages to the switching devices 66-72 can include the sequence of phases A, B and C used for pulse testing. In this technique, a pulse test might be performed in the phases ABCA, BCAB, CABC or combinations of the phases that are pulsed in an order that is recognized by a switching device to take certain actions.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A power restoration system for an electrical power distribution network, the system comprising:
 a feeder;
 a power source providing power to the feeder;
 a reclosing device electrically coupled to the feeder and including an interrupter switch and one or more sensors for measuring current and/or voltage on the feeder, where the reclosing device detects fault current and is operable to use the interrupter switch to open to clear the fault and is further operable to perform a fault testing process to detect the continued presence of the fault; and
 a plurality of switching devices electrically coupled along the feeder, wherein the reclosing device is operable to provide commands to selectively and independently change the state of the switching devices between an open state and a closed state and back to an open state as required to isolate the fault between adjacent switching devices;
 wherein the fault testing process is a pulse testing process and the reclosing device is operable to use the fault testing process to generate and selectively transmit defined messages as embedded pulse codes having a sequence of pulses on the feeder as the commands and each switching device is operable to recognize predetermined messages embedded in the timing of the pulse codes.

2. The system according to claim 1 wherein the reclosing device commands all of the switching devices to open after the pulse testing and the fault is detected.

3. The system according to claim 2 wherein the reclosing device sequentially transmits a command for closing one of the switching devices from a closest switching device to the reclosing device and then again performs the fault testing process so that the switching devices are sequentially closed in a predetermined order until the fault is again detected where the last switching device that was closed is then opened.

4. The system according to claim 1 wherein the reclosing device transmits the commands to the switching devices using one or more of RF, cellular, wireless and fiber optic communications.

5. A power restoration system for an electrical power distribution network, the system comprising:
 a feeder;
 a power source providing power to the feeder;
 a normally closed reclosing device electrically coupled to the feeder and including an interrupter switch and at least one sensor for measuring current and/or voltage on the at least one feeder, where the normally closed reclosing device detects fault current and is operable to use the interrupter switch to open to clear the fault and is further operable to perform a pulse testing process to detect the continued presence of the fault, the at least one normally closed reclosing device being operable to use the pulse testing process to generate and selectively transmit defined messages as embedded pulse codes having a sequence of pulses on the at least one feeder; and
 a plurality of switching devices electrically coupled along the feeder, each switching device including a section switch and one or more sensors for measuring current and/or voltage on the feeder, each switching device being operable to recognize predetermined messages embedded in the pulse codes, the normally closed reclosing device generating and transmitting the pulse codes to selectively and independently change the state of the section switches between an open state and a closed state and back to an open state if needed.

6. The system according to claim 5 wherein one of the pulse codes causes all of the switching devices to open.

7. The system according to claim 6 wherein the reclosing device provides a pulse code causing all of the switching devices to open after the pulse testing and fault detection.

8. The system according to claim 7 wherein the reclosing device sequentially transmits a pulse code for closing one of the switching devices from a closest switching device to the reclosing device and then again performs the pulse testing so that the switching devices are sequentially closed in a predetermined order until the fault is again detected where the last switching device that was closed is then opened.

9. The system according to claim 6 wherein the pulse code causing all of the switching devices to open is a sequence of pulses.

10. The system according to claim 9 wherein the sequence of pulses have pulses of the same polarity or pulses of a different polarity.

11. The system according to claim 5 wherein the messages embedded in the pulse codes are defined based on a time between the pulses, where each switching device changes its state based on the predetermined time for a specific switch.

12. The system according to claim 11 wherein a time is defined between beginnings of consecutive pulses of either polarity.

13. The system according to claim 11 wherein the pulse codes include one polarity pulse followed by an opposite polarity pulse.

14. The system according to claim 11 wherein the sequence of pulses includes at least three pulses where a time between two of the pulses is different than a time between two other of the pulses.

15. The system according to claim 11 wherein the sequence of pulses includes an alternating sequence of pairs of pulses where a time between the pulses in each pair is shorter than a time between the pairs of pulses.

16. A method for restoring power in a power distribution network comprising:
    detecting a fault condition on a power line by a first reclosing device;
    performing pulse testing by the first reclosing device to determine if the fault condition is still present;
    opening a plurality of sequential switches along the power line if the fault condition is still present by sending a first command from the first reclosing device to the plurality of sequential switches;
    closing a closest one of the plurality of sequential switches to the first reclosing device by sending a second command from the reclosing device to the plurality of sequential switches;
    again performing the pulse testing by the first reclosing device to determine if the fault condition is still present;
    closing a second closest one of the plurality of sequential switches to the reclosing device by sending a third command from the first reclosing device to the plurality of sequential switches if no fault current is detected;
    again performing the pulse testing by the first reclosing device to determine if the fault condition is still present;
    sequentially closing next closest ones of the plurality of sequential switches by sending unique commands for each switch from the first reclosing device and again performing the pulse testing by the first reclosing device until the pulse testing detects the fault condition; and
    opening the last of plurality of sequential switch that was closed by again sending the unique command for that switch from the first reclosing device;
    wherein opening a plurality of sequential switches along the power line includes sending a first predetermined pulse coded message on the power line from the first reclosing device to the switches, and wherein closing a closest one of the switches to the first reclosing device includes sending a second predetermined pulse coded message on the power line from the first reclosing device to the switches, and wherein closing a second closest one of the switches to the reclosing device includes sending a third predetermined pulse coded message on the power line from the first reclosing device to the switches.

17. The method according to claim 16 further comprising sending unique pulse coded messages to open and close switches from a second reclosing device coupled to the power line at an opposite end from the first reclosing device so as to open a switch on an opposite side of the faulted section from the switch that was opened by the first reclosing device.

18. The method according to claim 16 wherein the pulse coded messages are a sequence of pulses where a time between pulses in the sequence is longer than the time between the pulses used for the pulse testing.

* * * * *